Feb. 22, 1938.  H. OGLETREE  2,109,303
CUTTING IMPLEMENT
Filed April 6, 1937
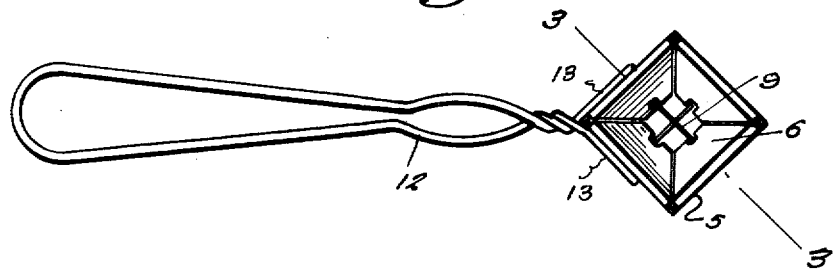
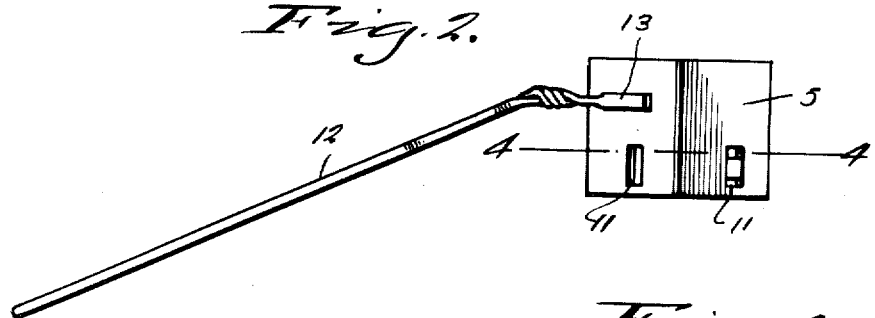
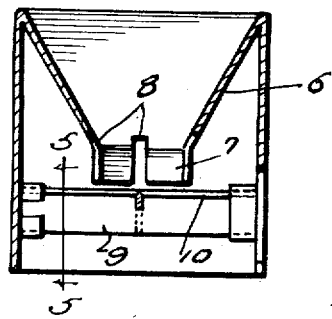
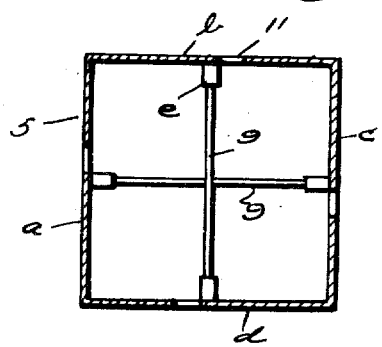
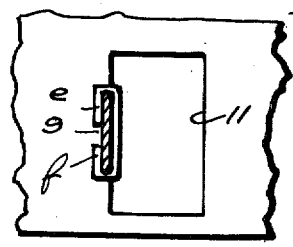
Inventor
Hill Ogletree
By Clarence A. O'Brien
Hyman Berman
Attorneys Patented Feb. 22, 1938

2,109,303

UNITED STATES PATENT OFFICE 2,109,303

CUTTING IMPLEMENT

Hill Ogletree, Austin, Tex.

Application April 6, 1937, Serial No. 135,323

1 Claim. (Cl. 146—162)

This invention appertains to new and useful improvements in cutting implements and more particularly to a cutter especially adapted for slitting beans and especially string beans.

The principal object of the present invention is to provide a cutter with which string beans can be engaged and slit longitudinally, thus preparing the beans in a manner whereby they can be cooked more thoroughly and satisfactorily in a shorter period of time.

Another object of the invention is to provide a cutting implement of the character stated which will be easily handled and without danger to the operator.

These and various other important objects and advantages of the invention will become apparent to the reader of the following specification.

In the drawing:—

Figure 1 represents a top plan view of the implement.

Figure 2 is a side elevational view.

Figure 3 is an enlarged vertical sectional view on the line 3—3 of Figure 1.

Figure 4 is an enlarged horizontal sectional view on the line 4—4 of Figure 2.

Figure 5 is an enlarged fragmentary sectional view taken substantially on the line 5—5 of Figure 3.

Referring to the drawing wherein like numerals designate like parts, it can be seen that the implement consists of the square-shaped wall structure 5 consisting of the side walls a, b, c, and d. Extending downwardly into the wall structure 5 from the top edge thereof is the downwardly tapering guideway 6 which is comprised of resilient sides that are provided with depending aprons 7 at their inner ends provided with upwardly extending slots 8 therein. There are four of these slots and underlying each pair of the same is a blade 9. These blades are provided with sharp upper edges 10 and each is provided with a transverse slot half way through its intermediate portion so that the blades can intersect each other as clearly shown in Figure 3.

The side walls a, b, c, and d are struck out as at 11 and the struck out portion is bent inwardly and over the upper and lower edges of the blades 9 as at e—f to serve as brackets for supporting the blades in the position shown in Figure 3. Thus string beans can be forced downwardly through the resilient guideway 6 and against the intersecting portions of the blades 9 to split the beans. Obviously when a split has been started, the bean can be grasped at its lower end and pulled downwardly through the implement, the sides of the guideway being sufficiently resilient to open and close so that aprons 7 will automatically follow the contour of the bean, urging it, regardless of thickness or size, immediately over where the blades 9 intersect while it is passing through the implement, insuring fairly uniform slices.

A twisted wire handle 12 is bent at an angle which improves the position of the implement while in use yet allows the hand of the user to remain in a comfortable, natural position has its end welded or otherwise secured as at 13 to the outside of the wall structure 5.

While the foregoing specification sets forth the invention in specific terms, it is to be understood that numerous changes in the shape, size and materials may be resorted to without departing from the spirit and scope of the invention as claimed hereinafter.

What is claimed is:—

A cutting implement of the character described comprising a shell open at its top and bottom, a downwardly extending resilient guide in the shell, a transversely extending blade in the shell, said blade underlying the lower end of the said guide and having its ends abutting a pair of opposed walls of the shell, and blade clamping brackets struck out from opposite sides of the shell, the upper and lower edges of the struck out portions being bent over the upper and lower edges of the blade for supporting the ends of the blade in the shell.

HILL OGLETREE.